United States Patent [19]

Tyler et al.

[11] Patent Number: 4,537,627
[45] Date of Patent: Aug. 27, 1985

[54] TECHNIQUE FOR REMOVING IMPURITIES FROM A COPPER MELT

[75] Inventors: Derek E. Tyler, Cheshire; Harvey P. Cheskis, North Haven; Paul D. Tungatt, Middletown, all of Conn.

[73] Assignee: Olin Corporation, New Haven, Conn.

[21] Appl. No.: 599,098

[22] Filed: Apr. 11, 1984

[51] Int. Cl.³ .............................................. C22B 15/00
[52] U.S. Cl. ........................................ 75/76; 75/93 R
[58] Field of Search ..................... 75/76, 93 R, 68 R; 210/184, 69

[56] References Cited

U.S. PATENT DOCUMENTS

| | | | |
|---|---|---|---|
| 3,039,864 | 6/1962 | Hess | 75/67 |
| 3,051,564 | 8/1962 | Drenning | 75/58 |
| 3,158,465 | 11/1964 | Brown | 75/58 |
| 4,265,659 | 5/1981 | Blome | 75/93 R |
| 4,277,281 | 7/1981 | Weber et al. | 75/93 R |
| 4,426,287 | 1/1984 | Narumiya | 210/184 |

*Primary Examiner*—Peter D. Rosenberg
*Attorney, Agent, or Firm*—Barry L. Kelmachter; Howard M. Cohn; Paul Weinstein

[57] ABSTRACT

A copper or copper alloy material having a reduced number of defects is formed by removing impurities from the material while in a molten state with a member having exposed silicon carbide particles. The member may be a bed filter formed from bed media having exposed silicon carbide particles, a porous body formed from a slurry containing silicon carbide, a porous body having at least one melt contacting surface coated with a silicon carbide material, and/or a lining having at least one melt contacting surface coated with a silicon carbide material.

16 Claims, 7 Drawing Figures

TECHNIQUE FOR REMOVING IMPURITIES FROM A COPPER MELT

The present invention relates to the treatment of molten copper metal or alloys to remove impurities therefrom.

The modern technology of treating molten metals to remove unwanted impurities has largely evolved about the treatment of aluminum. This is in part due to the relatively low melting temperature of aluminum making it easier to treat than most metals and in part due to the criticality of purity in aluminum and aluminum alloys.

A wide variety of techniques have been used to filter and/or degas aluminum melts. In one such technique, pure aluminum is recovered from aluminum containing materials by first reacting the aluminum containing material while it is in a molten state with an aluminum compound to produce aluminum enriched vapors. The vapors are then passed through a porous layer of heat-refractory granular materials and condensed at a surface of the porous layer. The layer of granular materials may consist of alumina, silica or clay powders. U.S. Pat. No. 2,715,063 to Weiss illustrates this type of purification technique.

Bed filters have been widely used to remove unwanted impurities, particularly non-metallic particles, from aluminum melts. These bed filters typically comprise layers of different sized refractory bed media positioned within a sump in a transfer trough or other molten metal conduit. Material such as chromite, corundum, forsterite, magnesia spinel, periclase, silicon carbide, zircon and tabular alumina have been used for the bed media. U.S. Pat. Nos. 2,863,558 to Brondyke et al., 3,039,864 to Hess et al. and 3,172,757 to Hess et al. illustrate some of the various bed filters used to purify light metals such as aluminum and magnesium.

Ceramic and/or refractory porous bodies have also been used to filter liquids, gases and molten metals. These porous bodies generally comprise a three-dimensional network cellular structure with a plurality of interconnected voids through which the material to be filtered passes. Many different ceramic and/or refractory materials have been used to form these filters. U.S. Pat. No. 3,175,918 to McGahan describes various porous refractory bodies which can be used in a wide range of applications including filters for liquids and gases. U.S. Pat. Nos. 3,893,917 to Pryor et al., 3,947,363 to Pryor et al., 3,962,081 to Yarwood et al., 4,024,056 to Yarwood et al., 4,075,303 to Yarwood et al., 4,257,810 to Narumiya, 4,258,099 to Narumiya, 4,265,659 to Blome, 4,342,664 to Blome and 4,343,704 to Brockmeyer illustrate various ceramic foam filters that are useful for filtering molten metal.

In U.S. Pat. No. 4,007,923 to Chia, a multistage technique for treating molten aluminum and aluminum alloys to remove solid and gaseous impurities is illustrated. In this technique, the molten metal flows through a series of successively arranged purification stages including a deslagging stage where the molten metal is filtered through a woven refractory filter, a fluxing stage, an adsorption stage where the molten metal is passed over a plurality of impurity-adsorbing refractory plates and a final filtration stage where the molten metal is filtered through a rigid, porous refractory filter medium.

It is known in the art that bed filters and ceramic foam filters may be used to remove impurities from copper melts. U.S. Pat. No. 4,330,327 to Pryor illustrates a bed filter for removing particulate matter from and/or reducing the oxygen content of a copper melt. U.S. Pat. No. 4,277,281 to Weber et al. illustrates a method and apparatus for continuously filtering molten copper in which disposable porous ceramic foam filters are mounted in a chamber through which a stream of molten copper flows. The filters are described as being open pore structures composed mainly of metallic oxides and metallic phosphates. The apparatus also includes an optional degassing system within the chamber.

Impurities such as oxides, carbides, unmelted pieces of alloy addition, slags and refractory pieces, in a melt cause defects in the final product which render it commercially unacceptable. Open pore structures such as ceramic plate filters have been used to remove impurities from molten metals, however, they appear to have limited effectiveness. The limits on their effectiveness relate to the minimum pore size and the operating conditions needed to obtain passage of the melt through the porous structure. As pore size decreases, the head of metal required to prime and sustain metal flow through a porous structure such as a filter increases. For a porous structure to have commercial applicability, the head and other operating conditions must be reasonable. In the past, the use of some porous structures for filtering copper melts have been limited by relatively high priming head requirements and relatively low metal flow rates. Still other porous structures have had limited applicability because the smallest impurity which can be removed and still have reasonable operating conditions is about 200 $\mu$m. Impurities this size can cause significant defects in the final product.

It is an object of the present invention to provide an efficient and effective process and apparatus for removing impurities from a copper or copper base alloy melt.

It is a further object of the present invention to provide a process as above which uses silicon carbide containing materials to remove impurities from the copper or copper alloy melt.

It is a further object of the present invention to provide a process for forming members from silicon carbide containing materials for use in the above process and apparatus.

These and other objects and advantages will become more apparent from the following description and drawings.

In accordance with the present invention, impurities such as oxides, carbides, unmelted pieces of alloy addition, iron-containing components including iron-rich solid particles and/or liquid droplets, slags and refractory pieces are removed from a copper melt by placing a member having exposed silicon carbide particles in contact with the melt. The member may be completely or partially immersed in the melt and may be a lining, a passageway, a filter or some other object through which the copper melt flows. For example, the member could be a porous, sponge-like or rigid body capable of being immersed in the copper melt. The member could also be a furnace lining or a transfer trough lining through which the melt flows. Furthermore, the member could be a bed filter or a ceramic foam filter through which the melt flows.

The present invention makes use of the discovery that certain impurities in copper melts can be captured by surfaces having exposed silicon carbide particles. While the capture mechanism is not completely understood, it is believed that certain impurities diffuse into the silicon and vice versa so that an almost metallurgical bonding of the impurity to the silicon carbide particles occurs.

It has been found that the present invention has particular utility in filtering media. In a first embodiment of the present invention, a bed filter is formed from a plurality of chips or bed media having exposed silicon carbide particles. The chips or bed media are preferably formed from a silicon carbide containing material containing from about 5% to about 99%, preferably about 15% to about 95% and most preferably from about 50% to about 90%, silicon carbide. In addition to the silicon carbide, the material may contain a filler material and/or a binder material. The filler material should be capable of being oxidized, volatilized, burned off or otherwise removed to expose the silicon carbide particles. A preferred chip material is clay bonded graphite.

When clay bonded graphite is used as the chip or bed media material, a preferred technique for forming the bed filter comprises pulverizing the clay bonded graphite into small particles, heat treating the particles in air and sieving the product into discrete particle size ranges. Thereafter, the bed filter is formed from the sized particles. The heat treatment preferably comprises heating the particles at a temperature in the range of about 650° C. to about 1100° C. for a time effective to expose the silicon carbide particles. The bed filter chips preferably have a size in the range of about 0.7 mm to about 2 mm, most preferably from about 0.9 mm to about 1.1 mm.

In a second embodiment of the present invention, a porous ceramic or refractory filter is formed with a silicon carbide containing core material. While the core may be fabricated in any suitable manner, it is preferred to form it from a silicon carbide containing slurry. If desired, the slurry may contain a binder material, a pore forming agent and/or a foaming agent and/or polyurethane foam. The slurry may be formed into the porous core structure by sintering the slurry to remove any liquid, volatiles or water therefrom and to burn off at least some of the slurry material to expose the silicon carbide particles. One advantage to forming the core from a silicon carbide containing core material appears to be the ability to remove impurities smaller than the pores.

In a variation of this second embodiment, the porous ceramic or refractory filter is formed from a porous core material coated with a silicon carbide containing material. Preferably, the core material is coated on those surfaces that contact the copper melt. The surfaces may be coated with the silicon carbide containing material in any desired manner.

As well as being useful for making filtering media, the present invention lends itself to other applications. For example, a furnace or other passageway lining may be coated with a silicon carbide containing material to remove impurities from molten metal coming in contact with the lining.

In using the various embodiments of the present invention, it is desirable to maximize the contact between the copper melt and the exposed silicon carbide particles. This can be done by maximizing the surface area having exposed silicon carbide particles.

Other embodiments and features of the present invention will become apparent from the following description and drawings.

As previously discussed, impurities in a copper melt can cause defects in a final product which render the product commercially unacceptable. Prior attempts to remove these impurities using filtering media such as open pore ceramic plate filters have failed because of unreasonable operating conditions, relatively low metal flow rates through the filtering media, and the inability to remove impurities smaller than 200 $\mu$m.

In accordance with the present invention, impurities may be removed from a copper melt by placing a silicon carbide containing material in contact with the copper melt. The silicon carbide containing material may be completely or partially immersed in the melt and may be a lining, a passageway, a filter or some other object having exposed silicon carbide particles. The present invention makes use of the discovery that impurities in a copper melt may be captured by silicon carbide particles exposed to the melt.

Figure 1:
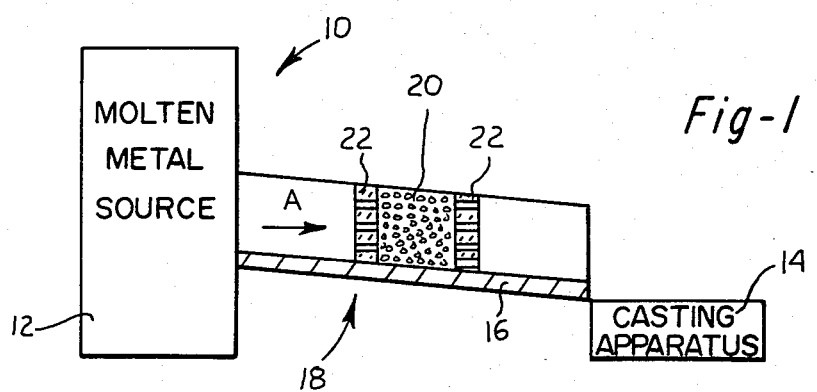
FIG. 1 is a schematic view in partial cross section of a first filter embodiment in accordance with the present invention.
Figure 4:
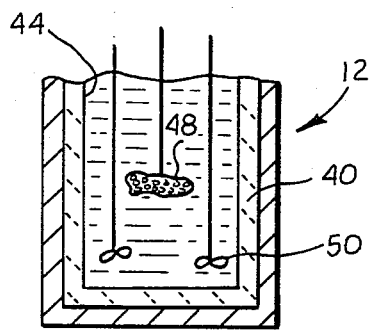
FIG. 4 is a schematic view in partial cross section of another embodiment of the present invention.

Referring now to the drawings, a typical casting system 10 is illustrated in FIG. 1. The casting system has a source of molten metal 12 such as a furnace, a banjo or the like, a casting apparatus 14 and a molten metal passageway or transfer trough 16 connecting the source 12 and the casting apparatus 14. The casting apparatus 14 may comprise any conventional continuous, semi-continuous, or slab casting system known in the art. The passageway or transfer trough 16 connecting the source 12 and the casting apparatus 14 may have any desired longitudinal and/or transverse configuration and/or any desired orientation. For example, it may be a flat bottomed trough. Alternatively, it may have a basin, sump or bowl portion, not shown, incorporated therein. Further, it may have a rectangular or a substantially V-shaped transverse cross section. Preferably, the bottom portion of the trough 16 is at an angle with respect to the horizontal. Of course, this is to take advantage of gravity during flow of the melt from the source to the casting apparatus. In most casting systems, the transfer trough 16 is lined with a heat insulating or refractory material 42.

In a first embodiment of the present invention, unwanted impurities may be removed from a copper melt by passing the melt through a bed filter 18 positioned in the transfer trough 16. The bed filter 18 is formed from a plurality of chips or other bed media 20 each having silicon carbide particles exposed at its outer surfaces. To maintain the bed filter in position, a porous body 22 is placed at each end of the bed filter. The porous bodies 22 may be mounted in the trough 16 in any suitable manner known in the art and may comprise screens, plates with one or more holes or pores, open pore ceramic plates and/or porous ceramic or refractory foam filters. Each body 22 preferably has sufficient porosity that metal flow through the filter is not impeded. The porosity should also be sufficient to permit priming of the filter under reasonable operating conditions.

The chips or bed media 20 may be formed from a wide variety of silicon carbide containing materials including naturally occuring materials and mixes of silicon carbide and other materials such as ceramic and/or refractory materials. The bed media material may contain from about 5% to about 99% silicon carbide. As used herein, the above percentages are weight percentages. Preferably, the material contains from about 15% to about 95% silicon carbide. Most preferably, it contains from about 50% to about 90% silicon carbide. In addition to the silicon carbide, the bed media material may contain a filler material and/or a binder material. While any suitable filler material known in the art may be used, it is preferred to use a filler material that can be oxidized, volatilized, burned off, dissolved, etched or otherwise removed to expose the silicon carbide particles. Suitable filler materials include carbonaceous materials such as graphite, wood, polymers such as polyurethane foam, waxes, rice husks, and other inorganic materials. Similarly, any suitable bonding material known in the art may be used. Suitable bonding materials include Tennessee clay, silicates such as calcium silicate, aluminates, phosphates, oxides, nitrides and carbides. The filler and/or binder material may constitute about 1% to about 95% of the bed media material, preferably from about 5% to about 85% and most preferably from about 10% to about 50% of the bed media material. When both a filler material and a binder material are present, the filler material preferably is present in an amount ranging from about 30% to about 70% of the total filler and binder material content. In a preferred embodiment, the bed filter 18 is formed from chips of clay bonded graphite. Clay bonded graphite consists of a graphite/silicon carbide mix bonded by clays.

One technique for forming the bed filter 18 comprises pulverizing clay bonded graphite into small particles, heat treating the particles in air and sieving the product into discrete particle size ranges. The heat treatment effectively oxidizes the surface graphite to expose the silicon carbide particles. Preferably, the heat treatment is performed at a temperature that is high enough to burn off the carbon but low enough to prevent oxidation of the silicon carbide. In a preferred embodiment, this heat treatment is performed at a temperature in the range of about 650° C. to about 1100° C. for a time which is effective to expose the silicon carbide particles, preferably at least about 4 hours and most preferably about 6 to about 12 hours. While it is preferred to oxidize bed media formed from clay bonded graphite, bed media formed from this and other materials may be processed in any suitable manner to expose silicon carbide particles.

The bed media 20 are sized to provide a desired flow rate through the filter 18. However, preferred size is a function of the shape of the individual pieces forming the bed media. Thus, the range of sizes which can be used to construct a filter having a desired flow depends upon the shape or shapes of the bed media. Similarly, the depth of the filter 18 in the trough 16 depends upon particle size. The larger the particle, the thicker the bed required. For a filter formed from oxidized clay bonded graphite, it is preferred to use chips having a size in the range of about 0.7 mm to about 2 mm, most preferably from about 0.9 mm to about 1.1 mm, as the bed media. It is also preferred to use a bed that is about 1" to about 2" deep.

In operation, the copper melt flows from the source 12 and into the trough 16 in the direction of arrow A. As the copper melt flows through the bed filter 18, impurities are captured by the exposed silicon carbide particles on the bed media 20. Thereafter, the purified melt flows to the casting apparatus 14 or some other apparatus for forming the molten metal into a desired product.

While the bed filter 18 has been illustrated as being in a transfer trough 16, it may be placed in other locations. For example, referring now to FIG. 2, it may be placed in a passageway 24 connecting a first crucible 26 and a second or catch crucible 28. The crucible 26 may be in communication with any molten copper source. Similarly, the crucible 28 may be in communication with any suitable casting apparatus. The crucibles 26 and 28 and the passageway 24 may be formed from any suitable material. Preferably, the passageway 24 is formed from a refractory material such as FIBERFRAX. If desired, the passageway 24 may be provided with an orifice 30 to control the melt flow rate.

Figure 3:
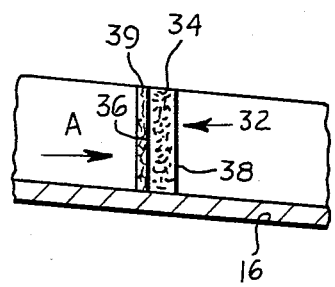
FIG. 3 is a partial cross-sectional view of an alternative filter embodiment in accordance with the present invention.
Figure 5:
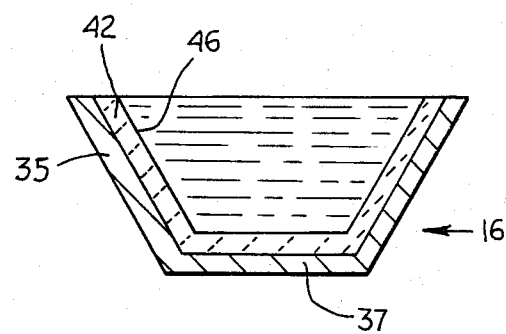
FIG. 5 is a schematic view in cross section of a further embodiment of the present invention.
Figure 7:
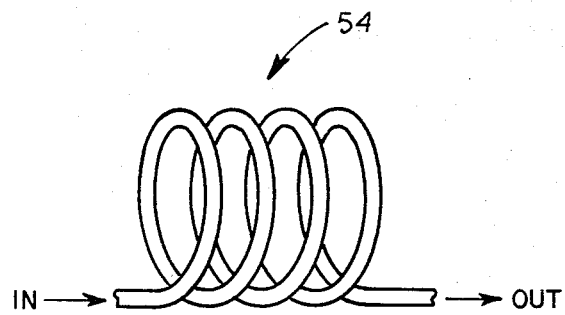
FIG. 7 is a perspective view of a spiral body in accordance with the present invention.
Figure 6:
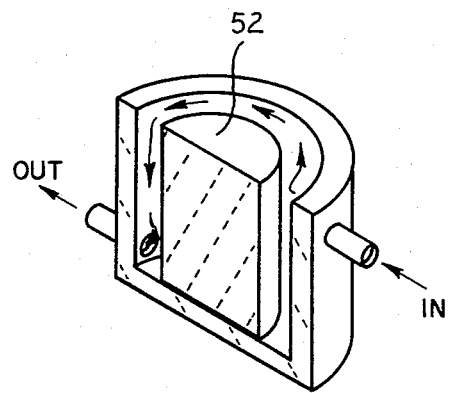
FIG. 6 is a sectional view of a cylindrically shaped body in accordance with the present invention.

In an alternative filtering approach shown in FIG. 3, the bed filter and the porous bodies in the transfer trough are replaced by at least one ceramic foam filter 32. If desired, more than one filter 32 may be used. Each ceramic foam filter 32 may be mounted in the trough 16 in any suitable manner and at any desired angle with respect to the melt flow direction A. For example, a notch, not shown, may be provided in each of the trough's sidewalls 35 and the ceramic filter mounted in the notch. Packing means may be placed about the periphery of each filter 32 to prevent unwanted metal flow between the filter and the trough walls 35 and 37. Alternatively, the filter 32 may be mounted in the trough 16 in a manner similar to one of those illustrated in U.S. Pat. No. 4,024,056 to Yarwood et al. Each filter 32 may have any desired shape. For example, its peripheral surfaces may be bevelled or straight edged.

In a first embodiment, each filter 32 has a core 34 formed from a porous material. Any suitable conventional porous material known in the art may be used to form the core 34. Preferably, the porous material comprises a ceramic or refractory foam material. To enhance the efficiency of the filter in accordance wit a first aspect of the present invention, the outer surfaces 36 and 38 of the core 34 are coated with a silicon carbide containing material. As the copper melt flows through the filter 32, the impurities contact and adhere to the coated surfaces. The surfaces 36 and 38 may be coated with the silicon carbide containing material in any desired manner. For example, the silicon carbide containing material may be brushed on, rolled on or sprayed on. Alternatively, sheets 39 of porous silicon carbide material may be bonded to the surfaces 36 and/or 38.

In using this type of filter, it has been found to be desirable to maximize the surface area contacting the melt, particularly on the melt inlet surface 36. One way of doing this is to increase the surface roughness of the filter 32. While it is preferred to coat both surfaces 36 and 38, the filter 32 could also be used with only the melt inlet surace 36 being coated.

Instead of forming the filter 32 from a porous material and coating the surfaces with a silicon carbide material, the filter 32 itself may be formed from a porous silicon carbide containing material. For example, the filter 32 may be formed from a silicon carbide containing slurry. If needed, the slurry may contain a binder material, a pore forming agent and/or a foaming agent and/or polyurethane foam. Any suitable technique known in the art may be used to form the slurry into a porous member, e.g., casting the slurry to form the member or immersing a polyurethane foam slab into the slurry. Thereafter, it is preferred to heat the porous member to remove water, liquids and/or volatiles therefrom, to burn off some of the slurry material to expose the silicon carbide, to achieve porosity and to at least in part cure the member. If necessary, the porous member may be subjected to an additional heat treatment to further cure and/or sinter the member. The temperature range and time for each heat treatment depend upon the particular slurry materials.

In operation, the melt flows through the porous filter 32 and the impurities are captured by the silicon carbide particles. One advantage of using both silicon carbide approaches is that the porous core material can have a range of pore sizes greater than the size of the impurities being removed.

As well as being useful for filtering media, the concepts of the present invention lend themselves to other applications. For example, both the molten metal source 12, e.g., furnace and the transfer trough 16 typically have linings 40 and 42, respectively, that contact the melt. Normally, these linings are made from a heat insulating or refractory material. To enhance the overall ability to remove impurities from the melt, the linings 40 and 42 may be coated with a silicon carbide containing material. This coating may be applied in any suitable manner, e.g., rolling, brushing or spraying onto the melt contacting surfaces 44 and 46, respectively. In lieu of coating the linings, the linings 40 and 42 themselves may be formed from a silicon carbide containing material. In this latter approach, it is desirable to form the lining so that the number of silicon carbide particles at the surface of the lining contacting the melt are maximized.

In yet another approach, a silicon carbide containing material may be formed into an annular or cylindrically shaped body 52 or a spiral body 54 through which the melt flows. Here again, it is desirable in forming these bodies to maximize the silicon carbide particles present on the surfaces exposed to the melt.

In still another approach, impurities may be removed from the melt by immersing a body 48 containing exposed silicon carbide particles in the melt. If desired, the body 48 may be a porous body. The body 48 may also be either rigid or flexible, e.g., sponge-like and may be formed from any suitable silicon carbide containing material. Further, it may be either completely or partially immersed in the melt.

For those applications where contact between the impurities and the exposed silicon carbide particles needs to be increased, e.g., the lining and immersed body applications, agitation of the melt may be provided. By agitating the melt, more of the impurities can be placed in contact with the exposed silicon carbide particles. Melt agitation may be provided using any suitable means 50 known in the art including but not limited to electromagnetic stirring and/or mechanical agitation. The agitation means 50 may be placed in any desired location, e.g., the molten metal source 12 and/or the transfer trough 16.

To demonstrate the present invention, the following examples were performed.

EXAMPLE I

Figure 2:
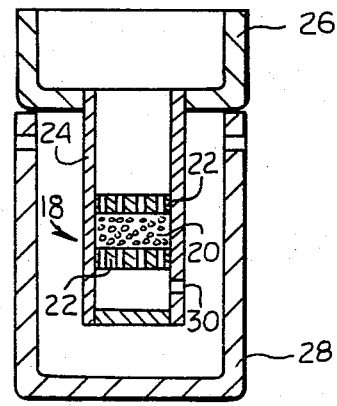
FIG. 2 is a schematic view in cross section of the filter embodiment of FIG. 1 in an alternative casting approach.

A filter bed similar to that shown in FIG. 2 was constructed from about 0.9 mm to about 1.1 mm oxidized clay graphite chips. The chips were prepared by pulverizing clay bonded graphite into small particles, heat treating the particles in air for about 8 hours at a temperature in the range of about 650° C. to about 1100° C. and sieving the particles into the desired size range. A two inch deep bed of chips was supported between two 50 ppi filters made from a type of ceramic foam known in the art by the trade name "SELEE" foam and marketed by the Consolidated Aluminum Corporation of St. Louis, Mo.

Using this construction, molten copper alloy C19400 having a nominal composition consisting of about 2.4% iron, about 0.13% zinc, about 0.04% phosphorous and the balance essentially copper was poured through the filter at a flow rate of up to 4 lbs./square inch/minute. The filtered melt and the spent filter were then examined. The filtered melt did not contain any intolerable impurities larger than 60 $\mu$m. The spent filter showed entrapment of particles with evidence of an attraction of certain impurities to the exposed silicon carbide particles.

EXAMPLE II

An open-core ceramic plate formed from a slurry containing silicon carbide particles and polyurethane foam was positioned in a passageway similar to that shown in FIG. 2 connecting two crucibles. Molten copper alloy C19400 having a nominal composition consisting of about 2.4% iron, about 0.13% zinc, about 0.04% phosphorous and the balance essentially copper was poured through the filter plate at a flow rate of up to 4 lbs./square inch/minute. The filtered melt and the filter were then examined. The filtered melt did not contain any intolerable impurities larger than 60 $\mu$m. The filter showed entrapment of particles with evidence of an attraction of certain impurities to the exposed silicon carbide particles.

After being cast, the filtered and/or purified material may be processed in any desired manner. For example, it may be hot worked, e.g. hot rolled, and/or cold worked, e.g. cold rolled, into a strip material. Further, it may be subjected to one or more heat treatments, e.g. anneals and/or interanneals for producing a desired temper in the materials.

While various filter embodiments have been described herein, filters consisting of beds and/or plates of appropriate silicon carbide containing media having various geometries and dispositions may be constructed.

While certain of the filter embodiments have been described as being formed from a slurry containing silicon carbide, they may also be formed from weaves of silicon carbide platelets and/or filaments.

While it is preferred that the silicon carbide used in the various embodiments be as pure as possible, the silicon carbide may contain impurities up to about 5%, preferably less than about 3%.

The silicon carbide containing material used to coat the various linings and/or filter surfaces may be in any desired form and may comprise any suitable silicon carbide containing material. For example, the coating may be formed from a slurry such as that discussed hereinbefore. Alternatively, a silicon carbide containing solution may be used to coat the various linings and/or surfaces. In still another approach, the silicon carbide material may be applied to the linings, filter surfaces and/or filter cores using an immersion coating technique.

While the present invention has been discussed in the context of providing purified material to be cast, the present invention is equally applicable to providing purified metal for other applications such as die forming and/or other foundry techniques.

While the present invention has utility in filtering copper melts in general, it has particular utility in filtering melts containing about 0.5% to about 5% iron. The melt may contain other desired elements.

The patents set forth in the specification are intended to be incorporated by reference herein.

While various techniques for forming porous filters have been described herein, a filter may be formed in accordance with the present invention by immersing a standard ceramic foam filter in a slurry containing a silicon carbide material, draining off excess slurry material and subjecting the filter to a heat treatment to cure it.

It is apparent that there has been provided in accordance with this invention a technique for removing impurities from a copper melt which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A process for forming a structure for removing impurities from a molten copper or copper base alloy, said process comprising:
   providing a material in a solid state consisting essentially of from about 5% to about 99% silicon carbide and the balance being selected from at least one of a filler material and a bonding material; and
   treating said material to expose silicon carbide particles at the outer periphery of said material to permit removal of said impurities by contact between said exposed silicon carbide particles and said molten copper or copper base alloy, said treating step maintaining said particles in an unoxidized condition.

2. The process of claim 1 further comprising:
   said material providing step including providing said material in chip form;
   sizing said chips to provide bed media within a desired range of sizes; and
   forming said bed media into a bed filter having a plurality of layers.

3. The process of claim 2 further comprising:
   positioning said bed filter between two porous bodies.

4. The process of claim 3 further comprising:
   positioning said bed filter and said porous bodies within a passageway through which said molten copper or copper base alloy flows; and
   removing said impurities by flowing said molten copper or copper base alloy through said bed filter and said porous bodies.

5. The process of claim 1 wherein said material providing step comprises:
   providing a material containing from about 15% to about 95% silicon carbide.

6. The process of claim 1 wherein said material providing step comprises:
   providing a material containing from about 50% to about 90% silicon carbide.

7. The process of claim 1 wherein said material providing step comprises:
   providing a material containing both a filler material and a bonding material, said filler material comprising from about 30% to about 70% of the total filler and bonding material content.

8. The process of claim 1 wherein said material providing step comprises:
   providing clay bonded graphite.

9. The process of claim 7 wherein:
   said treating step comprises heating said material to remove at least some of said filler and bonding materials to expose said silicon carbide particles.

10. The process of claim 9 wherein said heating step comprises:
    heating said silicon carbide and filler containing material to a temperature in the range of about 650° C. to about 1100° C. for a time sufficient to expose said silicon carbide particles.

11. A process for removing impurities from a molten copper or copper base alloy, said process comprising:
    providing a member formed from a material containing from about 5% to about 99% silicon carbide and at least one material selected from the group consisting of a filler material and a bonding material and having exposed silicon carbide particles; and
    placing said molten copper or copper base alloy in contact with said exposed particles so that said particles capture and remove at least some of said impurities in said molten copper or copper base alloy.

12. The process of claim 11 further comprising:
    agitating said molten copper or copper base alloy to promote increased contact between said exposed particles and said molten copper or copper base alloy.

13. The process of claim 11 wherein said placing step comprises:
    flowing said molten copper or copper base alloy through said member, said member acting as a means for filtering said molten copper or copper base alloy.

14. The process of claim 11 wherein said member providing step comprises:
    providing a member formed from a material containing from about 15% to about 95% silicon carbide.

15. The process of claim 11 wherein said member providing step comprises:
    providing a member formed from a material containing from about 50% to about 90% silicon carbide.

16. The process of claim 11 wherein said member providing step comprises:
    providing a member formed from a material containing both a filler material and a bonding material, said filler material comprising from about 30% to about 70% of the total filler and bonding material content.

* * * * *